UNITED STATES PATENT OFFICE.

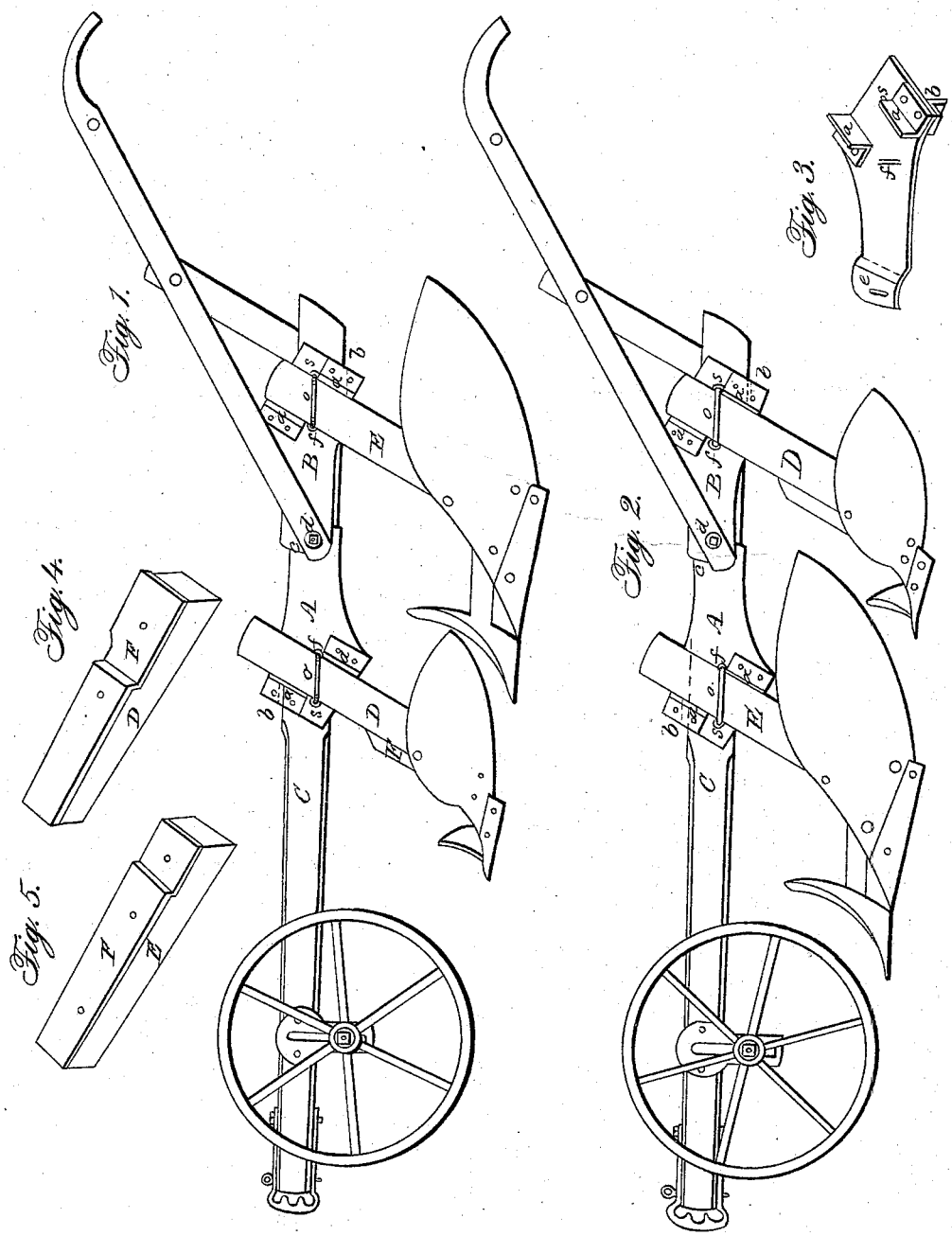

G. W. N. YOST, OF NASHVILLE, TENNESSEE, ASSIGNOR TO HIMSELF AND WILLIAM DILWORTH, JR.

IMPROVEMENT IN PLOWS.

Specification forming part of Letters Patent No. 39,536, dated August 11, 1863.

*To all whom it may concern:*

Be it known that I, GEORGE W. N. YOST, of Nashville, Davidson county, State of Tennessee, have invented certain new and useful Improvements in Plows; and I do hereby declare that the following is a full and exact description thereof, reference being had to the accompanying drawings, and to the letters of reference marked thereon.

In the drawings, Figure 1 is a side view with small plow in front. Fig. 2 is a side view with large plow in front. Fig. 3 shows one of the standard-holders. Fig. 4 shows the standard and cutter combined. Fig. 5 shows the standard without cutter.

To enable others to make and use my invention, I will describe its construction and operation.

In the drawings, C indicates the beam of the plow. A and B are the wrought-iron standard-holders. These standard-holders are made of plate-iron, and have right-angled angle-irons *a b* attached with rivets, or by welding, as is clearly shown in Fig. 3. Their contiguous ends lap, as shown at *c*, Figs. 1 and 2. The sockets are both on the same side of the beam, and are secured to it by the same screw-bolt, *d*, that holds the handles to the beam. This bolt *d* passes through slots *e* in the sockets. The other ends of the standard holders are secured by the square staples *o*, one leg of which passes through a hole, *s*, while the other plays in a slot, *f*. The object of these slots is to allow the sockets to be adjustable up or down, so as to give more or less inclination to the plow-standards. The angle-irons *b* serve to brace the sockets against the upper and under edges of the beam. D E indicate the plow-standards. These standards are made of wood, with a facing, F, (on the landside,) of sheet or bar iron, for the purpose of preventing the rapid wearing away of the wood by the friction against the soil. The front edge of the standard is protected by the plow. The bar or facing F may be sharpened so as to form a cutter, as shown on the standard D of the small plow. The standards are secured to the beam by placing them in the sockets A B and then fastening them in the desired position by tightening the nuts on the staples *o*.

It will be seen that I can readily exchange the plows. With the small plow in front it does good work and leaves the surface in excellent order. With the large plow in front it thoroughly loosens up the subsoil and leaves it in the furrow opened by the front plow, and not on the surface.

Having thus fully described the construction and operation of my invention, what I claim as new, and desire to secure by Letters Patent, is—

1. The wrought-iron standard-holders A B, constructed and arranged as described, in combination with the beam C.

2. The combination and arrangement of the standards D E with the standard-holders A B and beam C.

G. W. N. YOST.

Witnesses:
JOHN B. IRELAND,
RICHD. H. WILLIAMS.